US007165324B2

(12) United States Patent
Youn et al.

(10) Patent No.: US 7,165,324 B2
(45) Date of Patent: Jan. 23, 2007

(54) METHOD FOR MANUFACTURING A COMPOSITE HIGH VOLTAGE INSULATOR

(75) Inventors: Bok Hee Youn, Incheon-si (KR); Kyung Moo Bai, Gumi-si (KR)

(73) Assignee: LG Cable Ltd., Seoul (KR)

( * ) Notice: Subject to any disclaimer, the term of this patent is extended or adjusted under 35 U.S.C. 154(b) by 0 days.

(21) Appl. No.: 11/291,590

(22) Filed: Nov. 30, 2005

(65) Prior Publication Data

US 2006/0157268 A1 Jul. 20, 2006

(30) Foreign Application Priority Data

Jan. 14, 2005 (KR) ...................... 10-2005-0003748

(51) Int. Cl.
*B23B 9/00* (2006.01)

(52) U.S. Cl. ............................. 29/887; 29/874; 29/884

(58) Field of Classification Search .................. 29/887, 29/884, 874; 174/179
See application file for complete search history.

(56) References Cited

U.S. PATENT DOCUMENTS 4,331,833 A * 5/1982 Pargamin et al. ........... 174/179

FOREIGN PATENT DOCUMENTS

JP 8-212856 8/1996
JP 8-212859 8/1996

* cited by examiner

*Primary Examiner*—Jinhee Lee
(74) *Attorney, Agent, or Firm*—John P. White; Cooper & Dunham LLP

(57) ABSTRACT

Disclosed is a method for manufacturing a composite high voltage insulator in which a plurality of skirts are manufactured and joined to a rod, and more particularly to a method for manufacturing a composite high voltage insulator in which an expanding pipe is inserted into a plurality of skirts arranged in a line by a skirt holder to expand the inner diameters of the skirts, so that the skirts are mounted on precise positions of the rod, and an adhesive agent is easily applied, so that an interface between different materials is not formed in order to improve reliability of insulator products.

4 Claims, 3 Drawing Sheets

METHOD FOR MANUFACTURING A COMPOSITE HIGH VOLTAGE INSULATOR

BACKGROUND OF THE INVENTION

1. Field of the Invention

The present invention relates to a method for manufacturing a composite high voltage insulator in which a plurality of skirts are manufactured and joined to a rod, and more particularly to a method for manufacturing a composite high voltage insulator in which an expanding pipe is inserted into a plurality of skirts arranged in a line by a skirt holder to expand the inner diameters of the skirts, so that the skirts reach precise positions of the rod, and an adhesive agent is easily applied, so that an interface between different materials is not formed in order to improve reliability of insulator products.

2. Description of the Related Art

Generally, insulators are used to simultaneously insulate and mechanically maintain or support power transmission lines or naked wires of electric equipment, and include a plurality of bellows to achieve sufficient dielectric strength in order to increase the distance thereof per surface area. These bellows prevent the deterioration of the dielectric strength of the insulator, when the surface of the insulator is wet, particularly when salt content or dust is attached to the surface of the insulator.

The above insulators are divided according to application into suspension insulators used in power transmission lines, long-rod insulators, fog-type insulators used to withstand typhoon-force winds, pin insulators used in distribution lines, knob insulators used in interior wirings, insulating tubes, cleat insulators, and support insulators used in circuit breakers or arresters.

FIG. 1 is a sectional view of a conventional composite insulator.

The conventional composite insulator 20 comprises a sheath portion 22 formed on the outer surface of a core rod 10 made of FRP by covering the core rod 10 with a material having a high resistance to environments, such as air pollution or ultraviolet rays, for providing mechanical stress, and skirt portions 24 including sheds formed integrally with the sheath portion 22.

FIG. 2 is an exploded sectional view of the conventional composite insulator illustrating a modular-type method for manufacturing the conventional composite insulator.

The length of composite insulators used in superhigh-voltage lines increases in direction proportion to increase in service voltage. The increased length of the composite insulator generates various problems in a process for manufacturing the composite insulator.

A method for manufacturing the composite high voltage insulator by injection molding once does not form an interface between different materials, thus producing the most reliable product. However, since the composite high voltage insulator has a length of 3~7 m, it is difficult to solve the warpage of the rod 30, and since a mold corresponding to the length of the composite insulator and a large-volume catapult are essentially required, initial costs are increased.

In order to solve the above problems, a modular method, in which a sheath 34 and skirts 40 are separately molded and are then assembled and attached, has been proposed. In the above modular method for manufacturing a composite high voltage insulator, the sheath 34 and the skirts 40 are separately molded, the sheath 34 is inserted into holes formed through the skirts 40, and an adhesive agent is applied to an interface between the sheath 34 and the skirts 40 to attach the sheath 34 and the skirts 40.

The above conventional method for manufacturing a composite high voltage insulator is divided into two approaches. The first approach is where an adhesive agent is applied to the outer surface of the rod 30 covered with the sheath 34 and the rod 30 is inserted into the holes of the skirts 40 such that the skirts 40 slide towards the inside of the rod 30 using the lubricating function of the adhesive agent In this approach, when the inner diameters of the skirts 40 are excessively small, the adhesive agent applied to the rod 30 covered with the sheath 34 is peeled off by inserting the rod 30 into the holes of the skirts 20. Accordingly, it is difficult to uniformly apply the adhesive agent to the overall surface of the rod 30.

Further, when the inner diameters of the skirts 40 are excessively large, it is easy to insert the rod 30 into the holes of the skirts 40. However, in this case, adhesive characteristics caused due to the compressive force of the skirts 40 are not obtained, and an air layer may be formed in the interface between the skirts 40 and the sheath 34 after the manufacture of the insulator is completed. The above approach is disadvantageous in that the exposed adhesive agent generates an interface between difference materials, the above interface is a weak point of the composite insulator requiring the reliability, and the adhesive agent must have improved resistance to tracking and weather so that the composite insulator is proper to be used outdoors.

The second approach is that an adhesive agent is applied only to the inner walls of the holes of the skirts 40 or is applied to the surface of the rod 30 covered with the sheath 34 to be inserted into the holes of the skirts 40 so that the skirts 40 are attached to the rod 30 using the adhesive agent by inserting the rod 30 into the holes of the skirts 40 under the condition that the holes of the skirts 40 are expanded and then by releasing the expanded state of the holes of the skirts 40. However, this approach is disadvantageous in that it is difficult to expand the holes of the skirts 40 due to the general shapes of the skirts 40 and characteristics of materials of the skirts 40.

SUMMARY OF THE INVENTION

Therefore, the present invention has been made in view of the above problems, and it is an object of the present invention to provide a method for manufacturing a composite high voltage insulator in which a plurality of skirts are arranged in a line in a skirt holder and an expanding pipe is then inserted into the skirts under the condition that the expanding pipe is rotated to easily expand the inner diameters of the skirts so that an adhesive agent is uniformly applied to the outer surface of a rod by preventing the agent from being peeled off when the rod is inserted into the skirts, and the adhesive agent is not applied to the portion of the rod exposed to the outside to prevent the formation of an interface between different materials.

In accordance with the present invention, the above and other objects can be accomplished by the provision of a method for manufacturing a composite high voltage insulator comprising: manufacturing a plurality of skirts, and manufacturing a rod by covering an outer surface of an FRP rod with a sheath so that the skirts are continuously disposed along the cylindrical surface of the rod; arranging the skirts in a skirt holder such that the skirts are connected in a line; expanding inner diameters of the skirts by applying an adhesive agent to the outer surface of an expanding pipe and inserting the expanding pipe into the holes of the skirts under the condition that the expanding pipe is rotated at a designated speed; inserting the rod into the expanding pipe; positioning the inner surfaces of the holes of the skirts to contact the outer surface of the rod by separating the expanding pipe from the holes of the skirts; and hardening the adhesive agent by heating the skirts and the rod to a designated temperature for a designated time.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be described in detail with reference to the annexed drawings.

Figure 3:
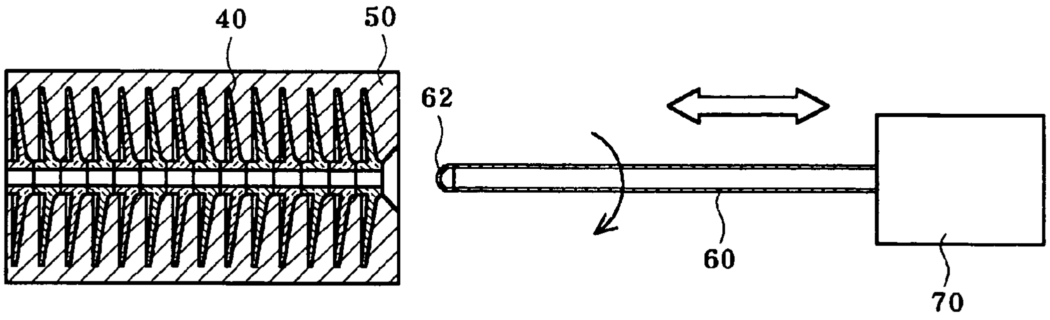
FIG. 3 is a sectional view illustrating the expansion of inner diameters of skirts in a method for manufacturing a composite high voltage insulator in accordance with the present invention.
Figure 4:
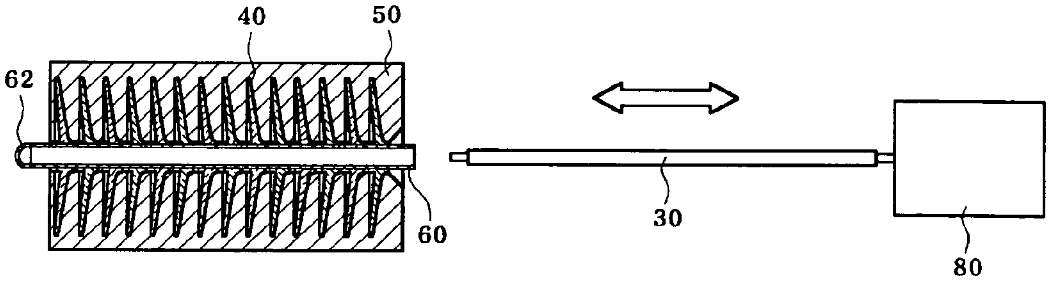
FIG. 4 is a sectional view illustrating the insertion of a rod into an expanding pipe in the method of the present invention.
Figure 5:
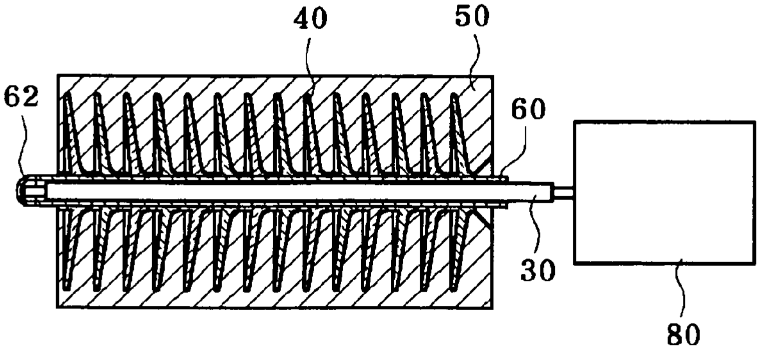
FIG. 5 is a sectional view illustrating the state of a skirt holder after the insertion of the rod into the expanding pipe in the method of the present invention is completed.
Figure 6:
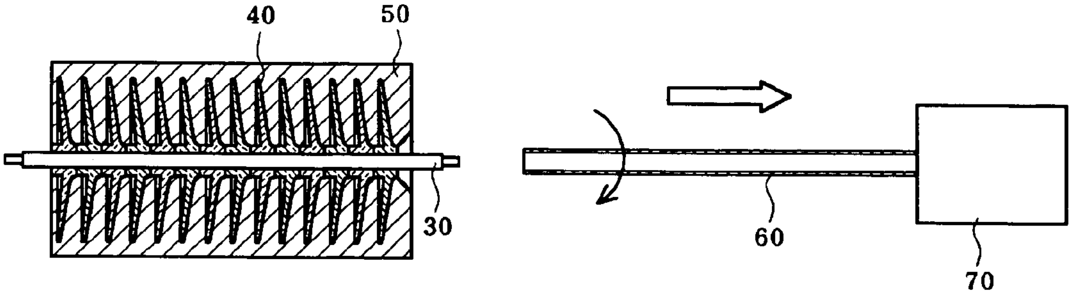
FIG. 6 is a sectional view illustrating the separation of the expanding pipe from the skirts in the method of the present invention.
Figure 7:
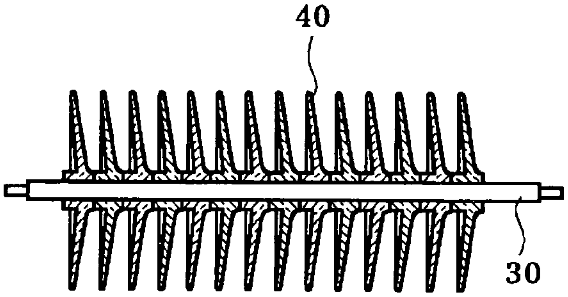
FIG. 7 is a sectional view illustrating the composite insulator manufactured by the method of the present invention.

FIG. 3 is a sectional view illustrating the expansion of inner diameters of skirts in a method for manufacturing a composite high voltage insulator in accordance with the present invention. FIG. 4 is a sectional view illustrating the insertion of a rod into an expanding pipe in the method of the present invention. FIGS. 5 and 6 are sectional views illustrating the state of a skirt holder after the insertion of the rod into the expanding pipe in the method of the present invention is completed.

The method for manufacturing a composite high voltage insulator in accordance with the present invention comprises manufacturing a plurality of skirts 40, and manufacturing a rod 30 by covering the outer surface of an FRP rod 32 with a sheath 34 so that the skirts 40 are continuously disposed along the cylindrical surface of the rod 30, arranging the skirts 40 in a skirt holder 50 such that the skirts 40 are connected in a line, expanding the inner diameters of the skirts 40 by applying an adhesive agent to the outer surface of an expanding pipe 60 and inserting the expanding pipe 60 into holes of the skirts 40 under the condition that the expanding pipe 60 is rotated at a designated speed, inserting the rod 30 into the expanding pipe 60, Positioning inner surfaces of the holes of the skirts 40 to contact the outer surface of the rod 30 by separating the expanding pipe 60 from the holes of the skirts 40, and hardening the adhesive agent by heating the skirts 40 and the rod 30 to a designated temperature for a designated time.

Figure 1:
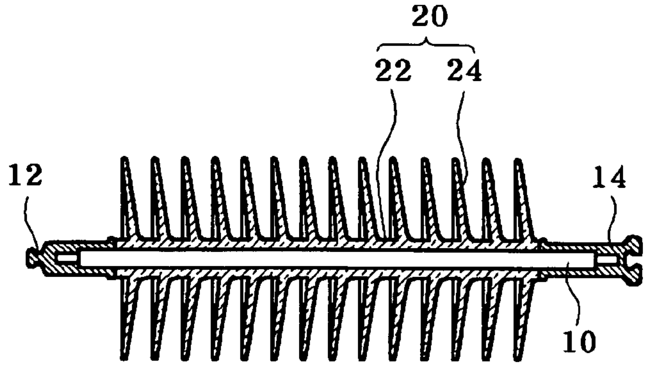
FIG.1 (PRIOR ART)
FIG. 1 is a sectional view of a conventional composite insulator.
Figure 2:
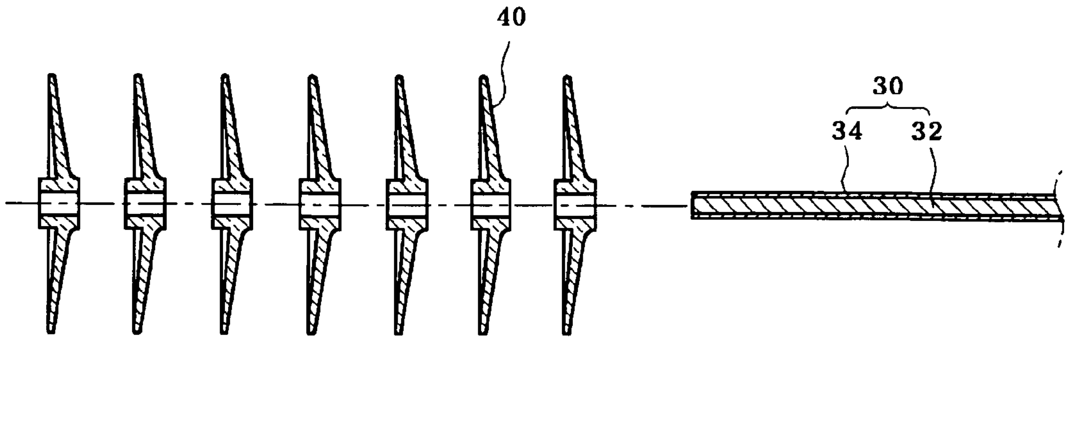
FIG.2 (PRIOR ART)
FIG. 2 is an exploded sectional view of the conventional composite insulator.

In the manufacture of the skirts 40 and the rod 30, the manufacture of the skirts 40 is achieved by general molding, and as shown in FIG. 2, a plurality of the skirts 40 are manufactured such that the skirts 40 are separated from each other.

The manufacture of the rod 30 is achieved by extrusion molding in which the outer surface of the FRP rod 32 is covered with the sheath 34. Here, the sheath 34 is formed on the RFP rod 32 separated from the skirts 40 by the extrusion molding, thereby allowing the rod 30 having a length of approximately 3 m to have a designated shape without partial disposition.

In the arrangement of the skirts 40, a plurality of the skirts 40 are continuously arranged in the skirt holder 50 such that the skirts 40 are spaced from each other by a designated interval. Here, the skirt holder 50 restrains the skirts 40, thereby allowing the expanding pipe 60 to be inserted into the holes of the plural skirts 40 by a single process. The skirt holder 50 may have various structures so long as the skirt holder 50 can support the plural skirts 40 without movement.

In the expansion of the inner diameters of the skirts 40, the expanding pipe 60, which is installed on a transfer system 70 such that the expanding pipe 60 is rotated at a designated speed and rectilinearly moves in a horizontal direction, is moved by the transfer system 70 and enters into the skirt holder 50, thereby being instead into the holes of the skirts 40.

Here, the inner diameter of the expanding pipe 60 is larger than the outer diameter of the rod 30 by approximately 1~5 mm so that the rod 30 can be inserted into the expanding pipe 60. Preferably, the expanding pipe 60 is made of an aluminum pipe having a thickness of approximately 1.5~5 mm.

A designated pattern is formed on the outer surface of the expanding pipe 60 so that the roughness of the outer surface of the expanding pipe 60 is increased, thereby allowing the adhesive agent to be maximally uniformly applied to the outer surface of the expanding pipe 60. Further, a front end 62 of the expanding pipe 60 has a conical shape so that the expanding pipe 60 can be more easily inserted into the holes of the skirts 40.

Hereinafter, the method for manufacturing the above composite insulator of the present invention will be described.

First, the skirts 40, which were manufactured in advance by molding, are installed in the skirt holder 50, and the adhesive agent is applied to the outer surface of the expanding pipe 60. Then, the expanding pipe 60 is inserted into the holes of the skirts 40 under the condition that the expanding pipe 60 is rotated, thereby expanding the inner diameters of the skirts 40.

The rotational speed of the expanding pipe 60 is varied according to the number of the skirts 40, into which the expanding pipe 60 is inserted. Most preferably, the rotational speed of the expanding pipe 60 is 30~300 rpm. The expansion of the inner diameters of the continuously arranged skirts 40 is more easily achieved by the lubricating function of the adhesive agent applied to the outer surface of the expanding pipe 60.

The skirts 40 are mounted on the outer surface of the rod 30 by inserting the rod 30 into the expanding pipe 60 and then separating the expanding pipe 60 from the skirts 40 as described above.

Thereafter, the skirt holder 50 provided with the skirts 40 and the rod 30 is hardened in a space maintained at a high temperature of 100~200° C. for at least 1 minute. Thereby, a composite high voltage insulator having a structure in which the adhesive agent is not exposed to the outside is manufactured.

[An Embodiment]

In accordance with an embodiment of the present invention, rods are manufactured by respectively covering FRP rods having diameters of 22 mm and 26 mm with sheathes made of silicon rubber having a thickness of 5 mm by extrusion molding. Then, the sheathes of the rods have thicknesses of 32 mm and 36 mm by vulcanization at a temperature of 270° C. for 10 minutes.

Skirts are manufactured such that the inner diameters of the skirts are smaller than the outer diameters of the rods by 1~5 mm, and expanding pipes are manufactured such that the inner diameters of the expanding pipes are larger than the outer diameters of the rods by 1~5 mm.

As apparent from the above description, the present invention provides a method for manufacturing a composite high voltage insulator, in which an expanding pipe to which an adhesive agent has been applied is simultaneously rotated and inserted into a plurality of skirts so that a rod is inserted into the expanding pipe under the condition that holes of the skirts are expanded, and the expanding pipe is then separated from the skirts, thereby mounting the skirts on precise positions of the outer surface of the rod so that the adhesive agent is uniformly applied between the skirts and a sheath and preventing the adhesive agent from being exposed to the outside of the insulator so that reliability of the composite high voltage insulator product is improved. Further, the method of the present invention is easily performed, thus reducing the time and costs taken to manufacture the composite high voltage insulator.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A method for manufacturing a composite high voltage insulator comprising the steps:

manufacturing a plurality of skirts, and manufacturing a rod by covering an outer surface of an FRP rod with a sheath so that the skirts are continuously disposed along the cylindrical surface of the rod;

arranging the skirts in a skirt holder such that the skirts are connected in a line;

expanding inner diameters of the skirts by applying an adhesive agent to the outer surface of an expanding pipe and inserting the expanding pipe into holes of the skirts under the condition that the expanding pipe is rotated at a designated speed;

inserting the rod into the expanding pipe;

positioning inner surfaces of the holes of the skirts to contact the outer surface of the rod by separating the expanding pipe from the holes of the skirts; and hardening the adhesive agent by heating the skirts and the rod to a designated temperature for a designated time, wherein the inner diameters of the skirts are smaller than the outer diameter of the rod, and the inner diameter of the expanding pipe is larger than the outer diameter of the rod.

2. The method as set forth in claim 1, wherein, in the expansion of the inner diameters of the skirts, the expanding pipe is inserted into the holes of the skirts under the condition that the expanding pipe is rotated at a speed of 30~300 rpm.

3. The method as set forth in claim 1, wherein the expanding pipe is provided with a front end having a conical shape.

4. The method as set forth in claim 2, wherein the expanding pipe is provided with a front end having a conical shape.

* * * * *